UNITED STATES PATENT OFFICE.

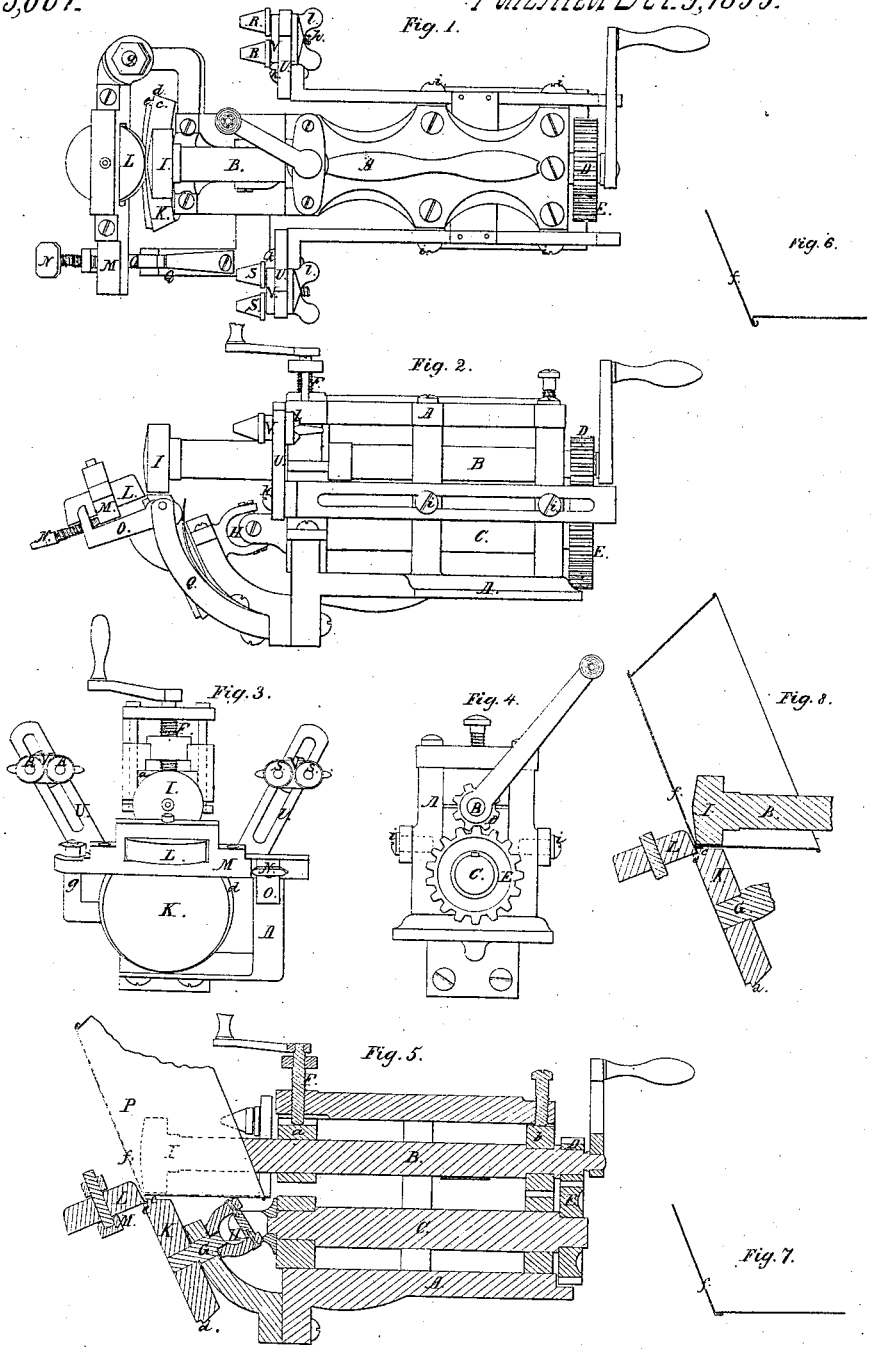

ELLIOT SAVAGE AND NOAH C. SMITH, OF EAST BERLIN, CONNECTICUT.

IMPROVEMENT IN MACHINES FOR DOUBLE-SEAMING CANS.

Specification forming part of Letters Patent No. 13,667, dated October 9, 1855.

*To all whom it may concern:*

Be it known that we, ELLIOT SAVAGE and NOAH C. SMITH, of East Berlin, in the county of Hartford and State of Connecticut, have invented an Improved Machine for Double-Seaming Cans or Articles Made of Sheet Metal; and we do hereby declare that the same is fully described and represented in the following specification and the accompanying drawings, letters, figures, and references thereof.

Of said drawings, Figure 1 denotes a top view of the said machine; Fig. 2, a side elevation of it; Fig. 3, a front end view, and Fig. 4 a rear end view, of it. Fig. 5 is a vertical, central, and longitudinal section of it.

In the said drawings, A is a metallic frame, which supports two arbors or shafts, B C, one of which is arranged above the other and connected with it by gears D E, as seen in the drawings. The boxes $a\,b$ of the upper or driving shaft, B, should be so applied to the frame as to enable said shaft to be raised above or depressed toward the other shaft by a screw, F, arranged as seen in the drawings. There is a third or short shaft, G, which is disposed with respect to the shaft C, and connected to it by a universal joint, H, as seen in the drawings. The shafts B and G, respectively, carry rollers I K, the lower one of which—viz., K— is formed conical in part, as seen at $c$, and with a shoulder, $d$, and cylindrical, as shown at $e$, the upper roller being intended to work within while the other operates without the pan, which, under the action of the machine, and when it is completing the first seaming or overlap of the bottom, is arranged as seen in dotted lines at P in Fig. 5. The position of the pan while the second or last seaming operation is being performed—that is, its position with respect to the conical surface of the lower roller—is shown in Fig. 8, which exhibits a section of the three rollers and pan.

Directly above the cylindrical portion $e$ of the lower roller, and so as to bear against the outer side of the bottom $f$ of the pan, there is arranged a bearing-roller, L, the same being disposed as seen in the drawings. This bearing-roller is carried by a lever, M, which turns on a fulcrum at $g$, and is pressed toward the pan by means of a screw, N, applied to a movable or turning latch, O, arranged as seen in Figs. 1 and 2, the said latch being applied to an arm or strut, Q, and so as to enable it to be turned downward, in order to permit the lever M to be moved upon its fulcrum in such manner as to carry the bearing-roller far enough out of contact with the pan so as not only to enable said pan to be removed from between the other rollers, but to allow another to be put in its place.

In order to guide the pan by its rim or outer edge, I employ two sets of conical rollers, R R and S S, the two rollers of each set being arranged with respect to one another as seen in Fig. 1. They should be attached to a screw, $h$, extended through a slotted arm, U, jointed to a slide, V, and in such manner as to enable it to be turned transversely of the slide or machine, such slide being so applied to the framework as to be capable of being moved either toward or away from the pan, and fastened in position by screws, as seen at $i\,i$. While the slotted arm U turns upon a clamp-screw, $k$, the screw which supports the two conical rollers of each set has a clamping-nut, $l$, applied to it for fixing it in any position within the limit of its movement, either upward or downward. By supporting the pan at its rim, and by means of two sets of conical gage rollers arranged as set forth, it will be much better sustained than when the gage-rollers are made to extend into the pan and work against its bottom, as they do in some other machines for seaming metal.

In using the above-described machine the first operation is to produce the "overlap," or "first seaming," as it is termed. This is done after the bottom has been applied to the body of the pan, as shown in Fig. 6, which exhibits a section of a portion of the bottom and side. The pan or vessel so prepared is arranged as seen in Fig. 5, and with the projecting part of its bottom resting on the cylindrical part E of the roller K and against the shoulder $d$, the bearing-roller being made to press the pan up to the shoulder, while the roller I forces it down upon the conical surface $c$. Under these circumstances, if the shaft B be put in rotation, the rollers will be revolved so as turn the pan around and produce the first seaming.

In order to effect the next portion of the operation, the upper roller, I, is to be raised a little, and the pan elevated and moved forward a short distance, or so as to cause the periphery of its bottom to rest upon the conical surface $c$. This having been accomplished, the bearing-roller is to be forced up against the bottom $f$, so as to press it into contact with the roller I. Next, the said roller I should be forced downward, so as to bend down the edge of the bottom against the side of the pan, as exhibited in Fig. 7. The rollers on being revolved will continue to bend down the lapped parts and finish the operation.

We do not claim for double-seaming the combination of three rollers applied and arranged as exhibited in the patent of George R. Moore, dated September 19, 1846; nor do we claim, in combination with such rollers, a gage for supporting the inside of the vessel or pan, at the bottom thereof, when the sides of said vessel are flaring and it is being double-seamed.

By our improved arrangement of the bearing-roller and the shoulder of the roller K, together and with respect to the rollers I K, we not only bring the periphery of the bearing-roller to operate against the outside surface of the bottom of the pan or vessel, but we are enabled to dispense with the operation of beveling or partially bending the two edges of the body and the bottom of the pan before their final bending or last bending for completing the operation of double seaming. Besides this, the arrangement of the periphery of the bearing-roller prevents it from abrading the tin or metallic surface, as a flanged roller as used in the said Moore's machine is likely to do.

What we claim as our improvement is—

1. The arrangement of the periphery of the bearing-roller L, that of the roller I, the cylindrical portion, shoulder, and conical part of the roller K, substantially as specified, and so as to operate together in manner and effect advantages as stated.

2. The above-described arrangement and application of two sets of conical rollers so as to receive and work against the rim of a pan or vessel and support it, as hereinbefore explained.

In testimony whereof we have hereunto set our signatures this 10th day of September, A. D. 1855.

ELLIOT SAVAGE.
      NOAH C. SMITH.

Witnesses:
 CHAS. A. ROYS,
 EDWARD WILCOX.